United States Patent [19]
Hettinga

[11] Patent Number: 5,336,460
[45] Date of Patent: Aug. 9, 1994

[54] PROCESS FOR MAKING MOLDED-IN LAMINA HINGE

[76] Inventor: Siebolt Hettinga, 2123 NW. 111th St., Des Moines, Iowa 50325

[21] Appl. No.: 89,617

[22] Filed: Jul. 12, 1993

Related U.S. Application Data

[63] Continuation-in-part of Ser. No. 759,929, Sep. 24, 1991, abandoned.

[51] Int. Cl.⁵ .................. B29C 45/04; B29C 45/14; B29C 45/16
[52] U.S. Cl. .................. 264/251; 264/266; 264/275
[58] Field of Search ............ 264/251, 266, 275, 316, 264/328.8, 510, 511, 254

[56] References Cited
U.S. PATENT DOCUMENTS

| | | |
|---|---|---|
| 2,687,157 | 8/1954 | Cowan . |
| 3,043,354 | 7/1962 | Fitzgerald . |
| 3,755,031 | 8/1973 | Hoffman et al. .......... 264/511 |
| 4,065,539 | 12/1977 | Nadel ................... 264/251 |
| 4,097,571 | 6/1978 | Cox ..................... 264/328.7 |

*Primary Examiner*—Jan H. Silbaugh
*Assistant Examiner*—A. Y. Ortiz

*Attorney, Agent, or Firm*—Brain J. Laurenzo; Kent A. Herink; Brett J. Trout

[57] ABSTRACT

A hinged plastic housing and a process for making same wherein a hinge formed from a deformable lamina is integrated with first and second enclosing members during injection of the plastic material. The deformable lamina is placed between the first mold section and the second mold section of an injection mold unit before the first mold section and the second mold section are clamped together to form injection mold cavities for the first and second enclosing members. The deformable lamina at least partially extends into the mold cavity for the first enclosing member and the mold cavity for the second enclosing member as well as therebetween. The first mold section and the second mold section are then clamped together and a plastic material is injected into the mold cavities and in bonding securement of the deformable lamina. The resultant housing is then removed from the mold unit with the deformable lamina hinge integrated with the first and second enclosing members. The deformable lamina may extend over the entire exterior or interior surfaces of the first and second enclosing members to form a combined hinge and exterior covering or interior lining respectively.

12 Claims, 4 Drawing Sheets

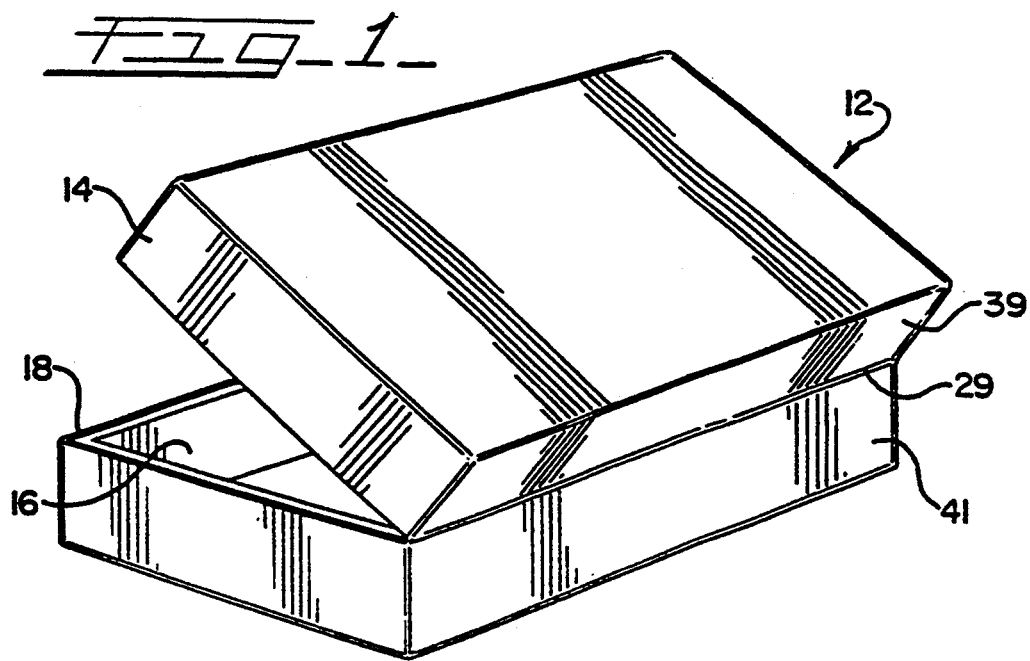
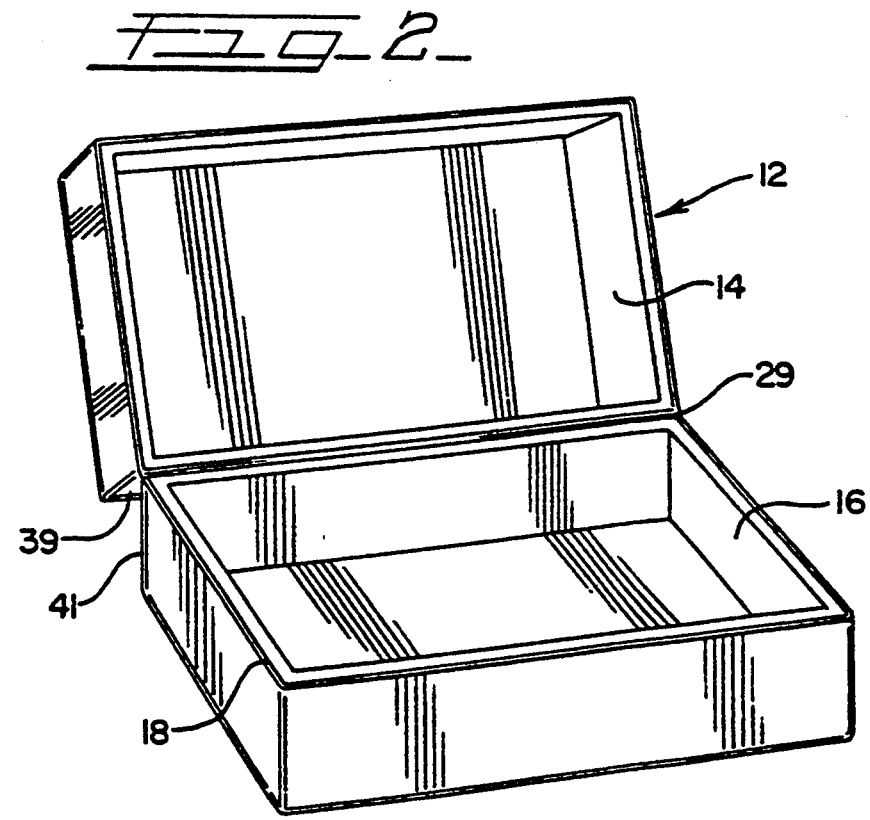

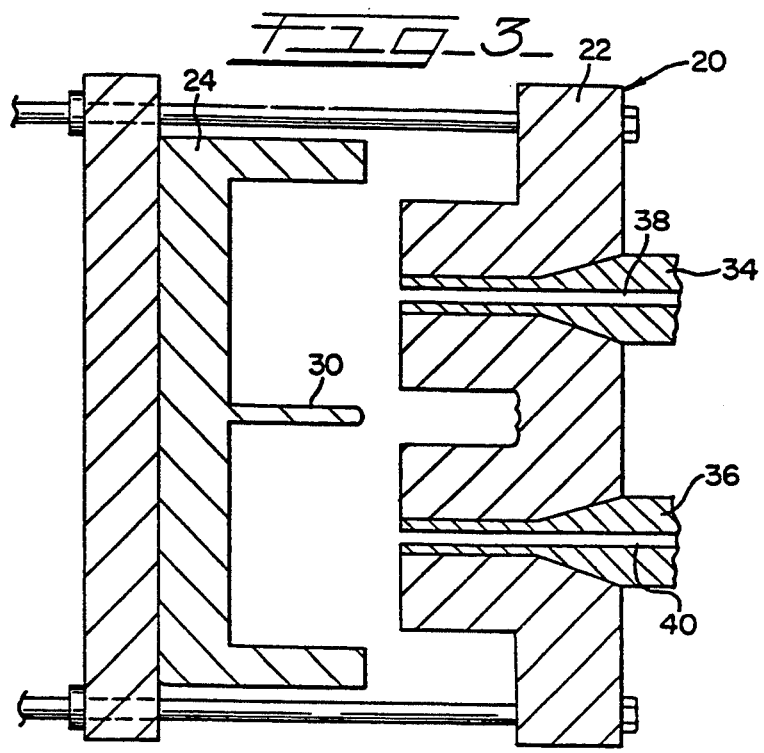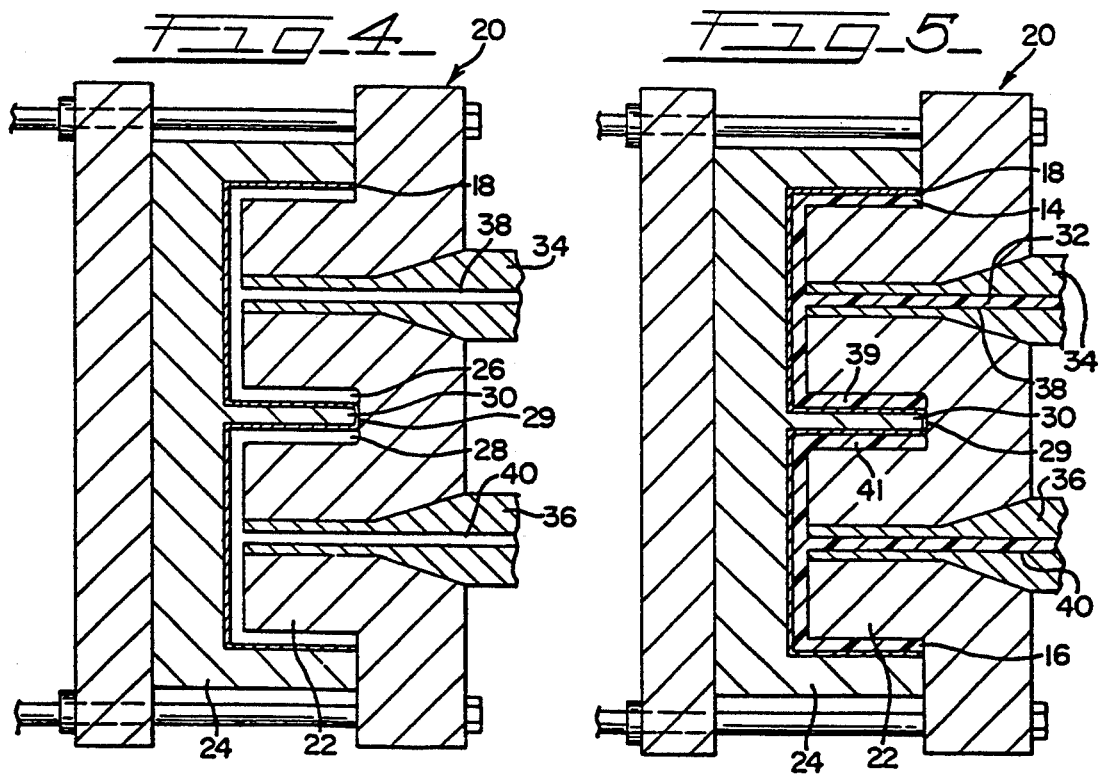

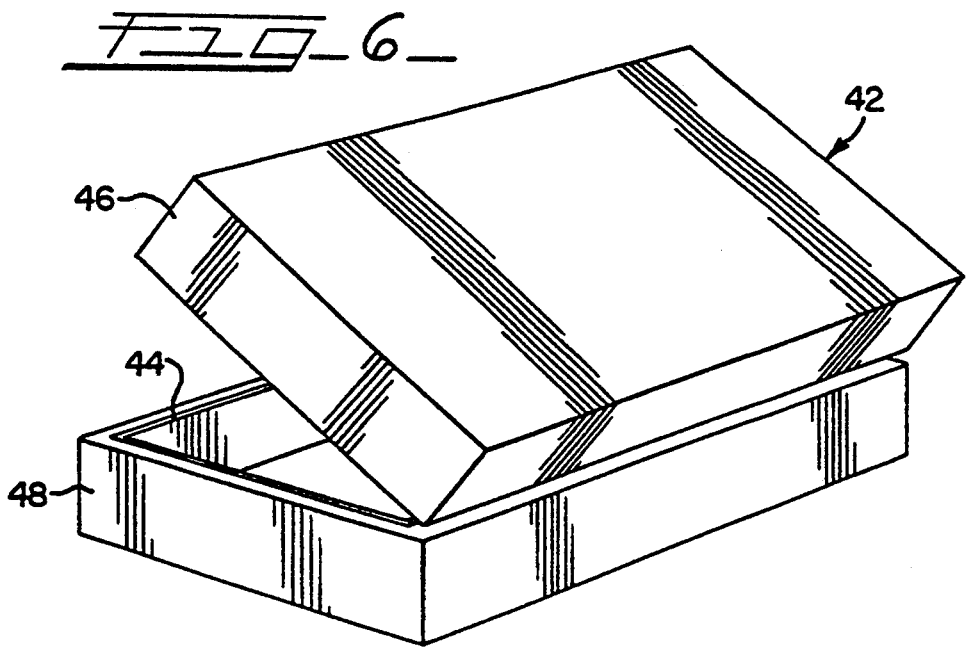
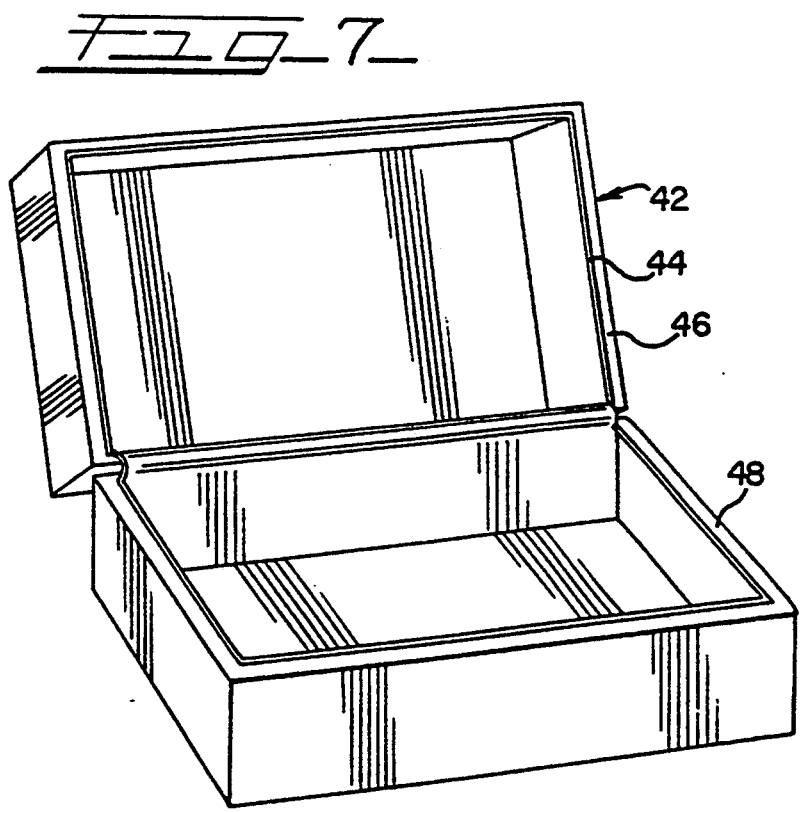

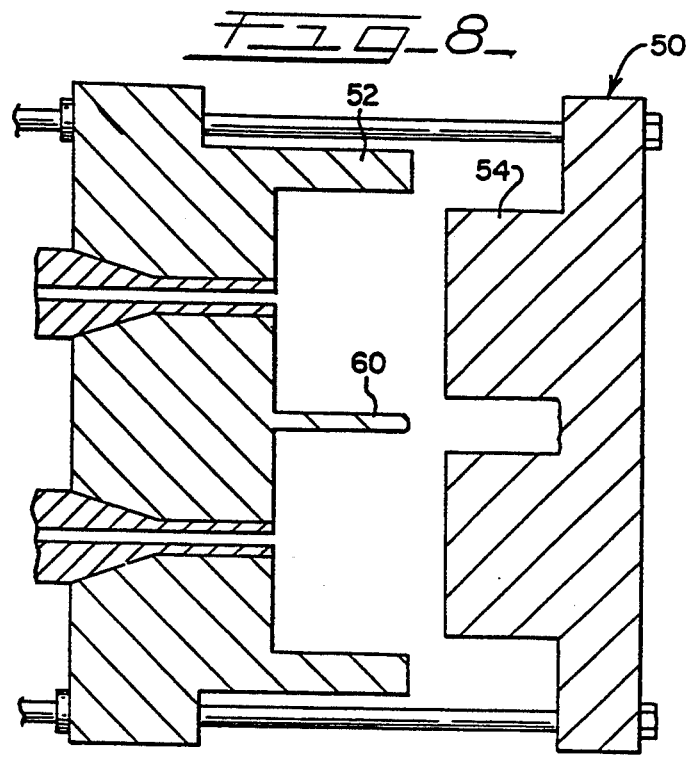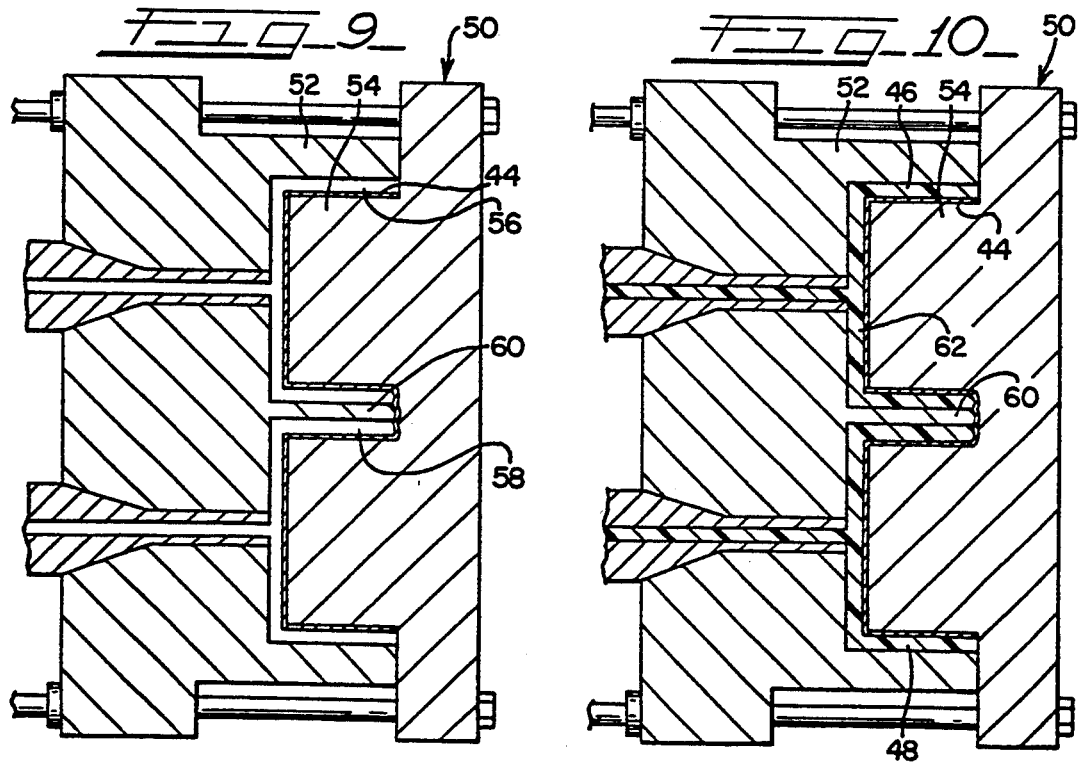

PROCESS FOR MAKING MOLDED-IN LAMINA HINGE

This application is a continuation-in-part of application Ser. No. 07/759,929, filed Sep. 24, 1991 now abandoned.

BACKGROUND OF THE INVENTION

The present invention relates generally to the injection molding of plastics and, more particularly, to a plastic housing having a hinge in the form of a deformable lamina which is integrated with first and second thermoplastic enclosing members during the injection of the plastic material.

In the past, in the manufacture of hinged plastic housings, tile top and bottom enclosing members, as well as the hinge therebetween, have all been molded in one plastic piece. The width and/or thickness of the plastic hinge between the top and bottom enclosing members is reduced thereby making the section flexible to enable the movement of the top enclosing member relative to the bottom enclosing member for opening and closing the housing. A problem with this housing is that the reduced width and/or thickness of the hinge section results in a weakened area which will gradually fatigue from repeated opening and closing of the housing until tile section finally fails.

In addition, in the past, in order to attach a decorative covering or lining to a plastic housing which is made of fabric, vinyl or other deformable material, it has been necessary to glue or otherwise adhesively bond the material to the plastic enclosing members in a separate step, after the plastic enclosing members have been molded. Such an additional step is labor intensive and time consuming thus making for an expensive process. Furthermore, the glue often releases after time resulting in an undesired appearance and an inferior product. In addition, many materials are not adhesively compatible with plastic to be securely bonded therewith by gluing.

The difficulties in the prior art housings and processes of manufacture are substantially eliminated by the present invention.

SUMMARY OF THE INVENTION

Accordingly, it is an object of the present invention to provide a hinged plastic housing in which a hinge in the form of a deformable lamina is permanently integrated with first and second thermoplastic enclosing members.

Another object of the present invention to provide a hinged plastic housing in which a combined surface covering and hinge in the form of a deformable lamina is permanently integrated with first and second thermoplastic enclosing members.

Yet another object of the present invention is to provide a process for molding a hinged plastic housing wherein a hinge in the form of a deformable lamina is integrated with first and second thermoplastic enclosing members during injection of the plastic material.

Still another object of the present invention is to provide a process for molding a hinged plastic housing wherein a combined surface covering and hinge in the form of a deformable lamina is integrated with first and second thermoplastic enclosing members during injection of the plastic material.

By the present invention, it is proposed to overcome the difficulties encountered heretofore. To this end, a deformable lamina is placed between the first mold section and the second mold section of a plastic injection mold unit before the first mold section and the second mold section are clamped together to form injection mold cavities for first and second thermoplastic enclosing members. The deformable lamina at least partially extends into the mold cavity for the first enclosing member and the mold cavity for the second enclosing member, as well as therebetween. The first mold section and the second mold section are clamped together and then a plastic material is injected into the mold cavities and in bonding securement of the deformable lamina. The resultant housing is then removed from the mold unit with the deformable lamina hinge integrated with the first and second enclosing members. Depending on the configuration of the mold unit and the positioning of the deformable lamina, the deformable lamina may extend over the entire exterior or interior surfaces of the enclosing members to form a combined hinge and exterior covering or interior lining respectively. No additional gluing steps are necessary.

BRIEF DESCRIPTION OF THE DRAWINGS

In the drawings:

FIG. 1 is a perspective view of the exterior portion of a hinged plastic housing having a combined deformable lamina cover and hinge integrated therein in accordance with the invention;

FIG. 2 is a perspective view of the interior portion of the housing shown in FIG. 1;

FIG. 3 is a sectional elevation of a mold unit for forming the plastic housing shown in FIGS. 1 and 2 with the mold unit shown in an open position;

FIG. 4 is illustrated similarly to FIG. 3 showing the deformable lamina placed between the first mold section and the second mold section thereof and showing the mold unit in a closed position;

FIG. 5 shows the closed mold unit shown in FIG. 4 after a plastic has been injected into the closed mold;

FIG. 6 is a perspective view of the exterior portion of an alternative hinged plastic housing having a combined deformable lamina lining and hinge integrated therein in accordance with the invention;

FIG. 7 is a perspective view of the interior portion of the housing shown in FIG. 6;

FIG. 8 is a sectional elevation of a mold unit for forming the plastic housing shown in FIGS. 6 and 7 with the mold unit shown in an open position;

FIG. 9 is illustrated similarly to FIG. 8 showing the single deformable lamina placed between the first mold section and the second mold section thereof and showing the mold unit in a closed position; and FIG. 10 shows the closed mold unit shown in FIG. 9 after a plastic has been injected into the closed mold.

DETAILED DESCRIPTION OF THE INVENTION

In the Figures, a hinged plastic housing 12, specifically, a hinged storage container and the process for making same, is shown, the housing 12 having a first thermoplastic enclosing member 14, a second thermoplastic enclosing member 16, and a single deformable lamina 18 for at least partially covering certain surfaces of the enclosing members 14 and 16, as well as hinging the enclosing members 14 and 16 together.

In the molding of the housing 12 shown in the preferred embodiment (FIGS. 1 and 2), a plastic injection mold unit 20 is provided having a stationary male mold section 22 and a movable female mold section 24 which, when the mold unit 20 is in its closed position (FIGS. 4 and 5), form mold cavities 26 and 28 for the enclosing members 14 and 16 respectively. With the mold sections 22 and 24 in their open positions (FIG. 3), the deformable lamina 18 is placed between the male mold section 22 and the female mold section 24. In the preferred embodiment, the deformable lamina 18 extends into both of the mold cavities 26 and 28, completely lining the female mold section portion of the mold cavities 26 and 28 to provide the surface covering, as well as between the mold cavities 26 and 28 at a partition wall 30 between mold cavities 26 and 28 to provide a hinge 29 between the resulting first and second enclosing members 14 and 16.

The female mold section 24 is then moved toward the male mold section 22 and clamped into a closed position thereby creating the mold cavities 26 and 28 for the first and second enclosing members 14 and 16 respectively. A plastic material 32 is then injected into the mold cavities 26 and 28 from injection nozzles 34 and 36 through respective gate openings 38 and 40 to fill the mold cavities 26 and 28 and securely bond the deformable lamina 18 with the plastic material 32. The partition wall 30 prevents the plastic material 32 from contacting the hinge portion 29 of the deformable lamina 18.

The female mold section 24 is then moved away from the male mold section 22 and the resultant hinged plastic housing 12, having a combined surface covering and hinge formed from the deformable lamina 18 integrated in a total bonded relationship with the first and second thermoplastic enclosing members 14 and 16, is removed.

The hinge portion 29 of the deformable lamina extends between corresponding sides 39 and 41 of enclosing members 14 and 16 respectively, the corresponding sides 39 and 41 which are spaced from one another. It has been found that the closer the enclosing members 14 and 16 are positioned toward one another, while still having an extending hinge portion of the deformable lamina 18 therebetween, the stronger the hinged container will be. This is due to the fact that the deformable lamina 18 has little rigidity.

The deformable lamina 18 may be comprised of any woven or non-woven material, textile, vinyl, film, or other like materials which can be deformed into the shape of the mold cavities 26 and 28 to at least partially cover desired surfaces of the enclosing members 14 and 16 while being strong enough to hinge the enclosing members 14 and 16 together.

The housing 12, having the deformable lamina 18 integrated with the first and second enclosing members 14 and 16, thus constitutes an integral one-piece unit which, depending on the material and configuration of the deformable lamina 18, the enclosing members 14 and 16, the plastic material 32, and the positioning of the deformable lamina 18 within the mold cavities 26 and 28, has a variety of applications. For example, this method could be utilized to form the hinged container shown in FIGS. 1 and 2 in which a combined exterior covering and hinge are formed from the deformable lamina 18 and integrated with the enclosing members 14 and 16. Such containers have traditionally been molded into a single piece of plastic with the hinge section being reduced in width and/or thickness. Such a plastic hinge often breaks under the fatigue of repeated opening and closing of the container. The deformable lamina hinge will provide a stronger hinge rather than the weakened section of plastic used previously. Furthermore, by molding in the deformable lamina 18, the expensive and inferior step of gluing decorative surface coverings about the enclosing members 14 and 16 of the prior art is eliminated.

It is anticipated that this process can be used to form all types of hinged plastic housings such as headrests, armrests, and sun visors for the automotive industry where the attachment hardware could be concealed within the hinged housing and the desired surface covering is exposed. The process could also be used to mold a cover for a book.

In an alternative embodiment shown in FIGS. 6-10, the present invention may also be used to form a hinged plastic housing 42 in which a deformable lamina 44 extends over the interior surfaces of first and second enclosing members 46 and 48, thereby lining the interior surfaces of the enclosing members 46 and 48 while still hinging the enclosing members 46 and 48 together. The alternative process is shown in FIGS. 8-10. A plastic injection mold unit 50 is provided having a stationary female mold section 52 and a movable male mold section 54 which, when the mold unit 50 is in its closed position (FIGS. 9 and 10), form mold cavities 56 and 58 for the enclosing members 46 and 48 respectively. With the mold sections 52 and 54 in their open positions (FIG. 8), the deformable lamina 44 is placed between the female mold section 52 and the male mold section 54. The deformable lamina 44 extends into both of the mold cavities 56 and 58 and over the male mold section portion of the mold cavities 56 and 58, as well as between the mold cavities 56 and 58 at a partition wall 60.

The male mold section 54 is then moved toward the female mold section 52 and clamped into a closed position thereby creating the mold cavities 56 and 58 for the first and second enclosing members 46 and 48 respectively. A plastic material 62 is then injected into the mold cavities 56 and 58 from injection nozzles 64 and 66 through respective gate openings 68 and 70 to fill the mold cavities 56 and 58 and securely bond the deformable lamina 44 with the plastic material 62. The partition wall 60 prevents the plastic material 62 from contacting the hinge portion 29 of the deformable lamina 18.

The male mold section 54 is then moved away from the female mold section 52 and the resultant hinged plastic housing 42, having the combined lining and hinge formed from the deformable lamina 44 integrated with the thermoplastic enclosing members 46 and 48, is removed. Again, depending on the material and configuration of the deformable lamina 44, the enclosing members 46 and 48, the plastic material 62, and the positioning of the deformable lamina 44 within the mold cavities 46 and 48, a variety of applications is anticipated. For example, this alternative process could be used to form an automotive glove box compartment.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, while the preferred embodiments show the deformable lamina as covering the entire exterior or interior surface of the enclosing members, it is anticipated that the deformable lamina may only cover certain desired portions of these surfaces such as those surfaces which are adjacent to the hinge portion of the deformable lamina only.

I claim:

1. A process of injection molding for forming a housing having a top thermoplastic enclosing member, a bottom thermoplastic enclosing member, and a hinge formed from a deformable lamina at least partially extending over a surface of said top enclosing member and a surface of said bottom enclosing member, said deformable lamina thereby hinging said top and said bottom enclosing members together, said process comprising the steps of:
  (a) providing a mold unit having a first mold section and a second mold section opposite to and in mating alignment with said first mold section, said first mold section having an extended mold cavity dividing member, said second mold section having a recess for receiving therein said extended mold cavity dividing member of said first mold section, upon clamping together of said first and second mold sections;
  (b) placing said deformable lamina between said first mold section and said second mold section, said deformable lamina extended between said mold cavity dividing member on said first mold section and said corresponding recess on said second mold section to form a hinge portion therebetween;
  (c) clamping said first mold section and said second mold section together using clamping means thereby forming mold cavities for said top enclosing member and said bottom enclosing member;
  (d) placing said mold cavity dividing member over at least said hinge portion of said deformable lamina, said mold cavities separated by said mold cavity dividing member, said mold cavity dividing member allowing said deformable lamina to pass between said mold cavities;
  (e) providing a first gate through which a plastic injection material will be injected from outside said mold cavity of said top enclosing member into said mold cavity of said top enclosing member;
  (f) providing a second gate through which said plastic injection material will be injected from outside said mold cavity of said bottom enclosing member into said mold cavity of said bottom enclosing member;
  (g) injecting said plastic material through said first and said second gates into said mold cavities and in bonding securement of said deformable lamina, said mold cavity dividing member preventing said plastic material from passing between said mold cavities, from contacting said hinge portion of said deformable lamina, and from being deposited on said hinge portion of said deformable lamina; and
  (h) removing said resultant housing from said mold cavities with said deformable lamina hinge portion integrated with said top and bottom enclosing members.

2. The process, according to claim 1, wherein said corresponding sides of said first enclosing member and said second enclosing member are spaced from one another and wherein said deformable lamina extends between said corresponding sides.

3. The process, according to claim 1, wherein said deformable lamina extends over an entire exterior surface of said first enclosing member and an entire exterior surface of said second enclosing member.

4. The process, according to claim 1, wherein said deformable lamina extends over an entire interior surface of said first enclosing member and an entire interior surface of said second enclosing member.

5. A process of injection molding for forming a housing having a top thermoplastic enclosing member, a bottom thermoplastic enclosing member, and a combined surface covering a hinge formed from a deformable lamina, said deformable lamina at least partially extending over a surface of said top enclosing member and a surface of said bottom enclosing member, said deformable lamina thereby at least partially covering said surfaces of said first and said second enclosing members as well as hinging said top and said bottom enclosing members together, said process comprising the steps of:
  (a) providing a mold unit having a first mold section and a second mold section opposite to and in mating alignment with said first mold section, said first mold section having an extended mold cavity dividing member, said second mold section having a recess for receiving therein said extended mold cavity dividing member of said first mold section, upon clamping together of said first and second mold sections;
  (b) placing said deformable lamina between said first mold section and said second mold section, said deformable lamina extended between said mold cavity dividing member on said first mold section and said corresponding recess on said second mold section to form a hinge portion therebetween;
  (c) clamping said first mold section and said second mold section together using clamping means thereby forming mold cavities for said top enclosing member and said bottom enclosing member;
  (d) placing said mold cavity dividing member over at least said hinge portion of said deformable lamina, said mold cavities separated by said mold cavity dividing member, said mold cavity dividing member allowing said deformable lamina to pass between said mold cavities;
  (e) providing a first gate through which a plastic injection material will be injected from outside said mold cavity of said top enclosing member into said mold cavity of said top enclosing member;
  (f) providing a second gate through which said plastic injection material will be injected from outside said mold cavity of said bottom enclosing member into said mold cavity of said bottom enclosing member;
  (g) injecting said plastic material through said first and said second gates into said mold cavities and in bonding securement of said deformable lamina, said mold cavity dividing member preventing said plastic material from passing between said mold cavities, from contacting said hinge portion of said deformable lamina, and from being deposited on said hinge portion of said deformable lamina; and
  (h) removing said resultant housing from said mold cavities with said deformable lamina surface covering and hinge portion integrated with said top and bottom enclosing members.

6. The process, according to claim 5, wherein said corresponding sides of said first enclosing member and said second enclosing member are spaced from one another and wherein said deformable lamina extends between said corresponding sides.

7. The process, according to claim 5, wherein said deformable lamina extends over an entire exterior surface of said first enclosing member and an entire exterior surface of said second enclosing member.

8. The process, according to claim 5, wherein said deformable lamina extends over an entire interior surface of said first enclosing member and an entire interior surface of said second enclosing member.

9. A process of injection molding for forming a housing having a top thermoplastic enclosing member, a bottom thermoplastic enclosing member, and a hinge formed from a deformable fabric, said deformable fabric at least partially extending over a surface of said top enclosing member and a surface of said bottom enclosing member, said deformable fabric thereby hinging said top and said enclosing members together, said process comprising the steps of:

(a) providing a mold unit having a first mold section and a second mold section opposite to and in mating alignment with said first mold section, said first mold section having an extended mold cavity dividing member, said second mold section having a recess for receiving therein said extended mold cavity dividing member of said first mold section, upon clamping together of said first and second mold sections;

(b) placing said deformable fabric between said first mold section and said second mold section, said deformable fabric extended between said mold cavity dividing member on said first mold section and said corresponding recess on said second mold section to form a hinge portion therebetween;

(c) clamping said first mold section and said second mold section together using clamping means thereby forming mold cavities for said top enclosing member and said bottom enclosing member;

(d) placing said mold cavity dividing member over at least said hinge portion of said deformable lamina, said mold cavities separated by said mold cavity dividing member, said mold cavity dividing member allowing said deformable fabric to pass between said mold cavities;

(e) providing a first gate through which a plastic injection material will be injected from outside said mold cavity of said top enclosing member into said mold cavity of said top enclosing member;

(f) providing a second gate through which said plastic injection material will be injected from outside said mold cavity of said bottom enclosing member into said mold cavity of said bottom enclosing member;

(g) injecting said plastic material through said first and said second gates into said mold cavities and in bonding securement of said deformable fabric, said mold cavity dividing member preventing said plastic material from passing between said mold cavities, from contacting said hinge portion of said deformable lamina, and from being deposited on said hinge portion of said deformable fabric; and (h) removing said resultant housing from said mold cavities with said deformable fabric hinge portion integrated with said top and bottom enclosing members.

10. The process, according to claim 9, wherein said corresponding sides of said top enclosing member and said bottom enclosing member are spaced from one another and wherein said deformable fabric extends between said corresponding sides.

11. The process, according to claim 9, wherein said deformable fabric extends over an entire exterior surface of said top enclosing member and an entire exterior surface of said bottom enclosing member.

12. The process, according to claim 9, wherein said deformable fabric extends over an entire interior surface of said top enclosing member and an entire interior surface of said bottom enclosing member.

* * * * *